US012600376B2

(12) United States Patent
Bork et al.

(10) Patent No.: US 12,600,376 B2
(45) Date of Patent: Apr. 14, 2026

(54) TERRAIN ADJUSTED TIRE PATH DISPLAY

(71) Applicant: FCA US LLC, Auburn Hills, MI (US)

(72) Inventors: Michael A. M. Bork, Auburn Hills, MI (US); Nicholas A Durham, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/758,434

(22) Filed: Jun. 28, 2024

(65) Prior Publication Data

US 2026/0001569 A1     Jan. 1, 2026

(51) Int. Cl.
B60W 50/14       (2020.01)
B60K 35/235      (2024.01)
B60K 35/28       (2024.01)
G06V 20/59       (2022.01)

(52) U.S. Cl.
CPC ........... B60W 50/14 (2013.01); B60K 35/235 (2024.01); B60K 35/28 (2024.01); G06V 20/597 (2022.01); B60K 2360/1868 (2024.01); B60K 2360/785 (2024.01); B60W 2050/146 (2013.01); B60W 2420/403 (2013.01); B60W 2420/408 (2024.01); B60W 2540/18 (2013.01); B60W 2540/225 (2020.02); B60W 2552/15 (2020.02)

(58) Field of Classification Search
CPC ........... B60W 50/14; B60W 2540/225; B60W 2552/15; B60W 2420/408; B60W 2050/146; B60W 2420/403; B60W 2540/18; G06V 20/597; B60K 35/28; B60K 35/235; B60K 2360/785; B60K 2360/1868

See application file for complete search history.

(56) References Cited

U.S. PATENT DOCUMENTS

| | | | | |
|---|---|---|---|---|
| 9,619,432 B2 * | 4/2017 | Brandin | .................. | G06F 17/00 |
| 10,996,469 B2 * | 5/2021 | Huh | ........................ | G06T 11/60 |
| 12,162,483 B2 * | 12/2024 | Cole | ..................... | B60W 40/13 |
| 2007/0068273 A1 * | 3/2007 | Cunningham | ......... | G07C 5/085 |
| | | | | 73/781 |
| 2019/0031101 A1 * | 1/2019 | Yousefian | ............... | G06T 11/60 |
| 2020/0198624 A1 * | 6/2020 | Akatsuka | .............. | B60W 10/18 |
| 2021/0206318 A1 * | 7/2021 | Iida | ......................... | G06T 11/00 |
| 2022/0289293 A1 * | 9/2022 | Turok | ................ | B62D 15/0295 |
| 2023/0022485 A1 * | 1/2023 | Fujita | .................... | G09G 3/002 |
| 2023/0078320 A1 * | 3/2023 | Salter | ................. | G01C 21/3833 |
| | | | | 701/1 |
| 2023/0136633 A1 * | 5/2023 | Cole | .................... | B62D 15/021 |
| | | | | 701/70 |
| 2024/0019929 A1 * | 1/2024 | Uhlig | ..................... | B60K 35/22 |

FOREIGN PATENT DOCUMENTS

| | | | | | |
|---|---|---|---|---|---|
| CN | 115810281 A | * | 3/2023 | ......... | G01C 21/3833 |
| JP | 2006153459 A | * | 6/2006 | | |
| WO | WO-2007038278 A2 | * | 4/2007 | ............ | G01L 5/225 |

* cited by examiner

*Primary Examiner* — Chico A Foxx
(74) *Attorney, Agent, or Firm* — Jeremy J. Klobucar

(57) ABSTRACT

A method for displaying travel path graphics in a vehicle includes determining a slope of the ground ahead of a vehicle, determining a steering angle of the vehicle, and providing a travel path graphic on a display of the vehicle. The travel path graphic is provided as a function of the steering angle and the slope of the ground ahead of the vehicle.

15 Claims, 4 Drawing Sheets

TERRAIN ADJUSTED TIRE PATH DISPLAY

FIELD

The present disclosure relates to a system for providing improved tire path displays for a vehicle travel path.

BACKGROUND

Some vehicles include back-up cameras that show an area behind a vehicle when the vehicle is in reverse gear, to help a driver operate the vehicle in reverse. The camera image is provided on a dashboard or instrument panel display of the vehicle, below a vehicle and a graphic to indicate the vehicle path of travel is sometimes provided, and is curved to reflect a steering angle of the vehicle and the path the vehicle will take at a given steering angle. Among other things, the indicated path is not adjusted as a function of the vehicle inclination or attitude or the slope of the terrain in the path of travel.

SUMMARY

In at least some implementations, a method for displaying travel path graphics in a vehicle includes determining a slope of the ground ahead of a vehicle, determining a steering angle of the vehicle, and providing a travel path graphic on a display of the vehicle. The travel path graphic is provided as a function of the steering angle and the slope of the ground ahead of the vehicle.

In at least some implementations, the method also includes determining an attitude of the vehicle and wherein a position of the travel path graphic on the display is adjusted as a function of the attitude of the vehicle. In at least some implementations, in addition to determining the attitude of the vehicle the method includes determining a viewing angle of a driver of the vehicle, and wherein the display is a heads-up display provided on or near a vehicle windshield and wherein the position of the travel path graphic on the display is adjusted as a function of the viewing angle.

In at least some implementations, the method includes determining a viewing angle of a driver of the vehicle, and wherein the display is a heads-up display provided on or near a vehicle windshield and wherein the position of the travel path graphic on the display is adjusted as a function of the viewing angle.

In at least some implementations, the travel path graphic has a different shape if the ground ahead is determined to be inclined than if the ground ahead is determined to be level. In at least some implementations, the travel path graphic has a different shape if the ground ahead is determined to slope downwardly than if the ground ahead is determined to be either inclined or level.

In at least some implementations, the travel path graphic includes lines that represent a determined path of two wheels of the vehicle. In at least some implementations, the lines converge at a constant angle if the ground ahead is determined to be level. In at least some implementations, the lines have an increased angle of convergence lower on the display than higher on the display if the ground ahead is determined to be inclined. In at least some implementations, the lines have a decreased angle of convergence lower on the display than higher on the display if the ground ahead is determined to slope downwardly.

In at least some implementations, a system used to display travel path graphics in a vehicle includes one or more vehicle sensors, a control system in communication with the one or more vehicle sensors, and having a processor and memory with programming. The programming is configured to determine a slope of the ground ahead of a vehicle, determine a steering angle of the vehicle, and provide a travel path graphic on a display of the vehicle. The travel path graphic is provided as a function of the steering angle and the slope of the ground ahead of the vehicle, and the travel path graphic has a different shape if the ground ahead is determined to be uphill, downhill or level.

In at least some implementations, the one or more vehicle sensors includes a steering angle sensor.

In at least some implementations, the one or more vehicle sensors includes at least one terrain sensor.

In at least some implementations, the at least one terrain sensor includes one or more of a camera, radar or lidar sensor.

In at least some implementations, the at least one terrain sensor includes a remote source including altitude data for an area including the ground ahead.

In at least some implementations, the display is a heads-up display that is provided at least in part on a windshield of the vehicle. In at least some implementations, a driver sensor is communicated with the control system to permit determination of a viewing angle of a driver of the vehicle relative to the heads-up display. In at least some implementations, a location of the travel path graphic relative on the heads-up display is adjusted as a function of the viewing angle. In at least some implementations, a location of the travel path graphic relative on the heads-up display is adjusted as a function of the vehicle attitude.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
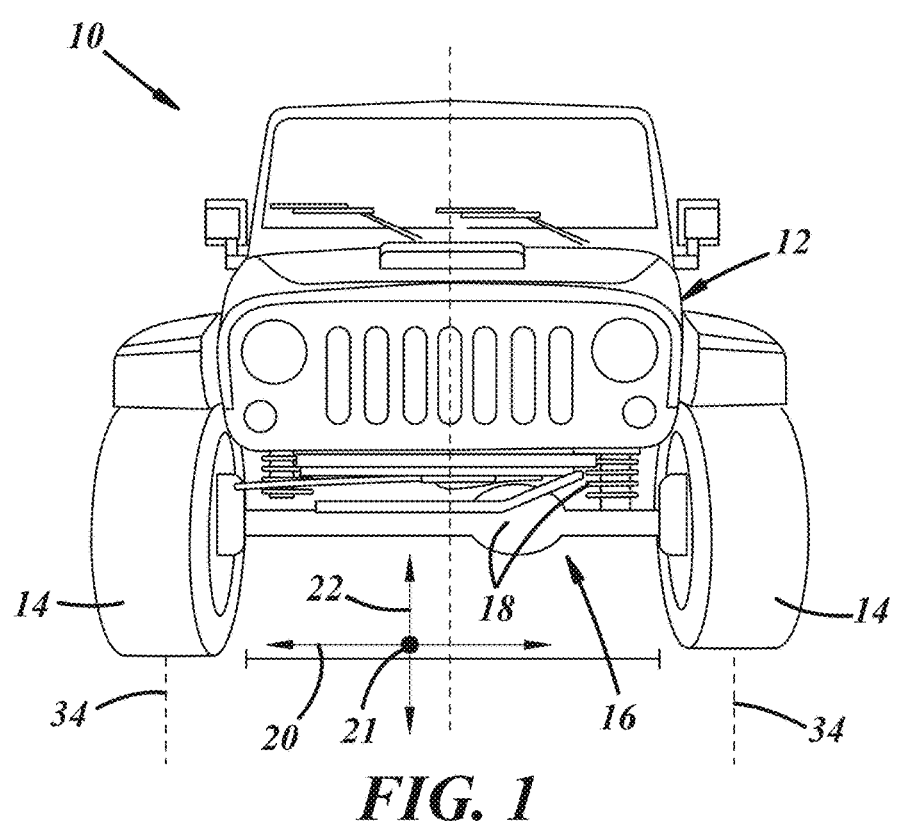
FIG. 1 is a front view of a vehicle.

Referring in more detail to the drawings, FIG. 1 illustrates the front of a vehicle 10 having a body 12 and multiple wheels 14 coupled to the body 12 by a vehicle suspension 16 having various suspension components 18 as is known. Two front wheels 14 are shown in FIG. 1 and they are spaced apart horizontally, sometimes called a cross-car direction, extending between driver and passenger sides of the vehicle 10, and shown by arrow 20. The front of the vehicle 10 leads the rear of the vehicle 10 in a fore-aft direction 21 extending into/out of the page in FIG. 1, and the body 12 is suspended off a ground surface by the wheels 14 and vehicle suspension 16, in a vertical direction shown by arrow 22, which is parallel to the direction of gravity when the vehicle 10 is on a flat, level road oriented perpendicular to gravity.

Figure 2:
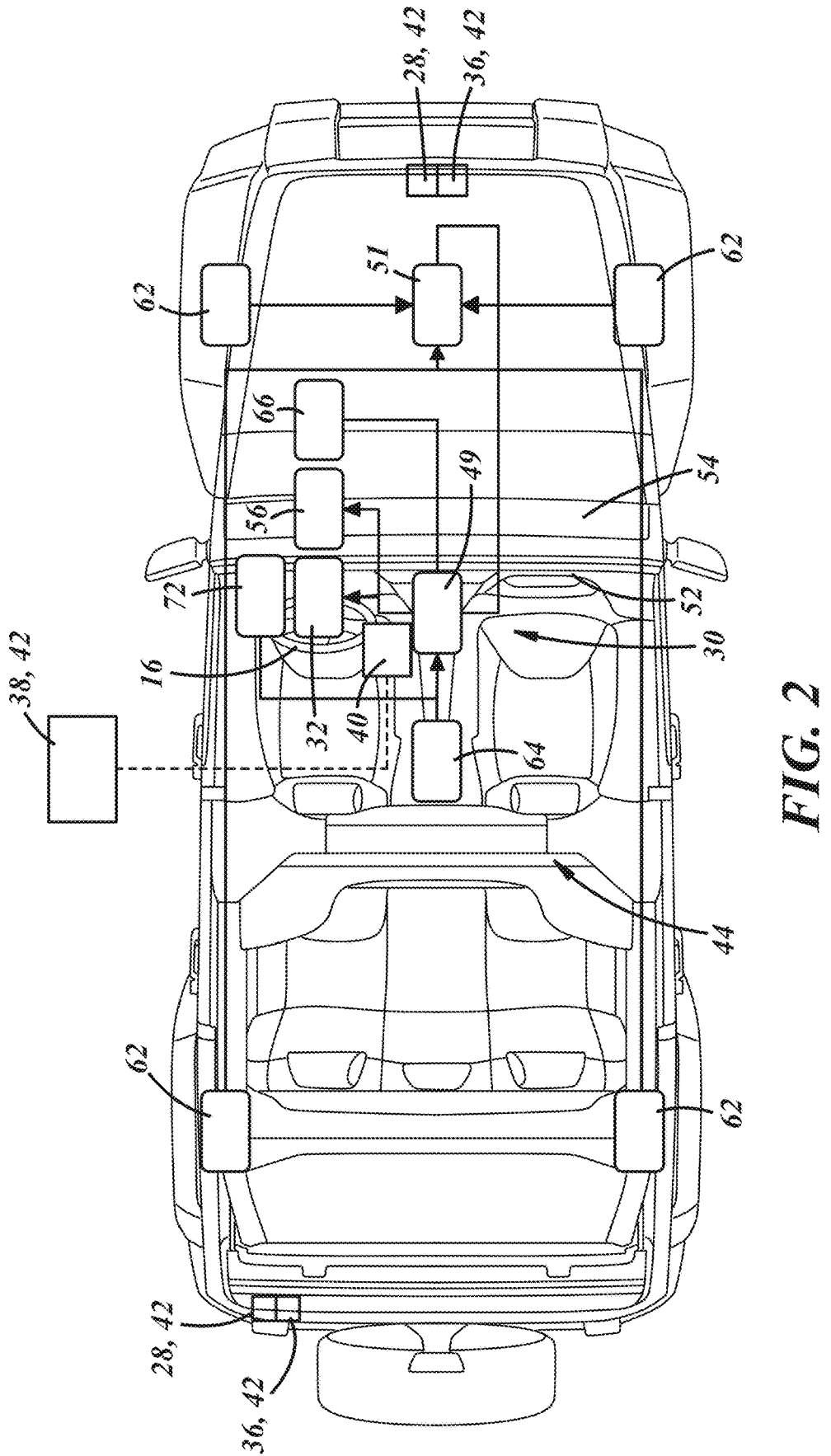
FIG. 2 is a diagrammatic top view of a vehicle showing a vehicle control system.

As shown in FIG. 2, the vehicle 10 may also include a steering input, such as a steering wheel 26, a camera 28, a control system 30, and a display 32. The steering input is any device by which a driver may command a change in the steering angle of the wheels 14 to turn the vehicle 10. The steering angle changes as the wheels 14 are rotated about a vertical axis 34 (FIG. 1).

The camera 28 is carried by the vehicle body 12 and has a lens with a viewing angle that includes an area to be traversed by the vehicle 10. When the vehicle 10 is moving in the forward direction, a forward-facing camera 28 can be used to view, sense or display the terrain in front of the vehicle 10. When the vehicle 10 is moving in reverse, that is in the rearward direction, a rearward-facing camera 28 can be used to view, sense or display the terrain at the rear or behind the vehicle 10. So the vehicle 10 may have one or more cameras, as desired, to show one or more areas of the environment in which the vehicle 10 is located.

To further sense or determine the terrain in the area of the vehicle 10, the vehicle 10 may include object detection sensors 36 such as, but not limited to, RADAR, LIDAR, ultrasonic, and other sensors 36 that may emit a detection output (e.g. light or sound waves) and be responsive to detection inputs (e.g. reflected light or sound waves) to determine the presence of objects in the path of the emission(s). Still further, other data sources 38 may be remote from the vehicle 10 and available to the control system 30 and provide information about the terrain in the area of the vehicle 10, such as GPS and map data which may include the elevation, altitude and/or relative grade of the portion of a road, trail or other surface on which the vehicle 10 is travelling. The remote data sources 38 may be communicated with the vehicle 10 in any suitable manner, such as via a cellular or other wireless network and via a communications device 40 (e.g. telematics unit) of the vehicle 10. The cameras 28, object detection sensors 36 and remote data sources 38 may be collectively referred to herein, for convenience, as terrain sources 42.

Figure 3:
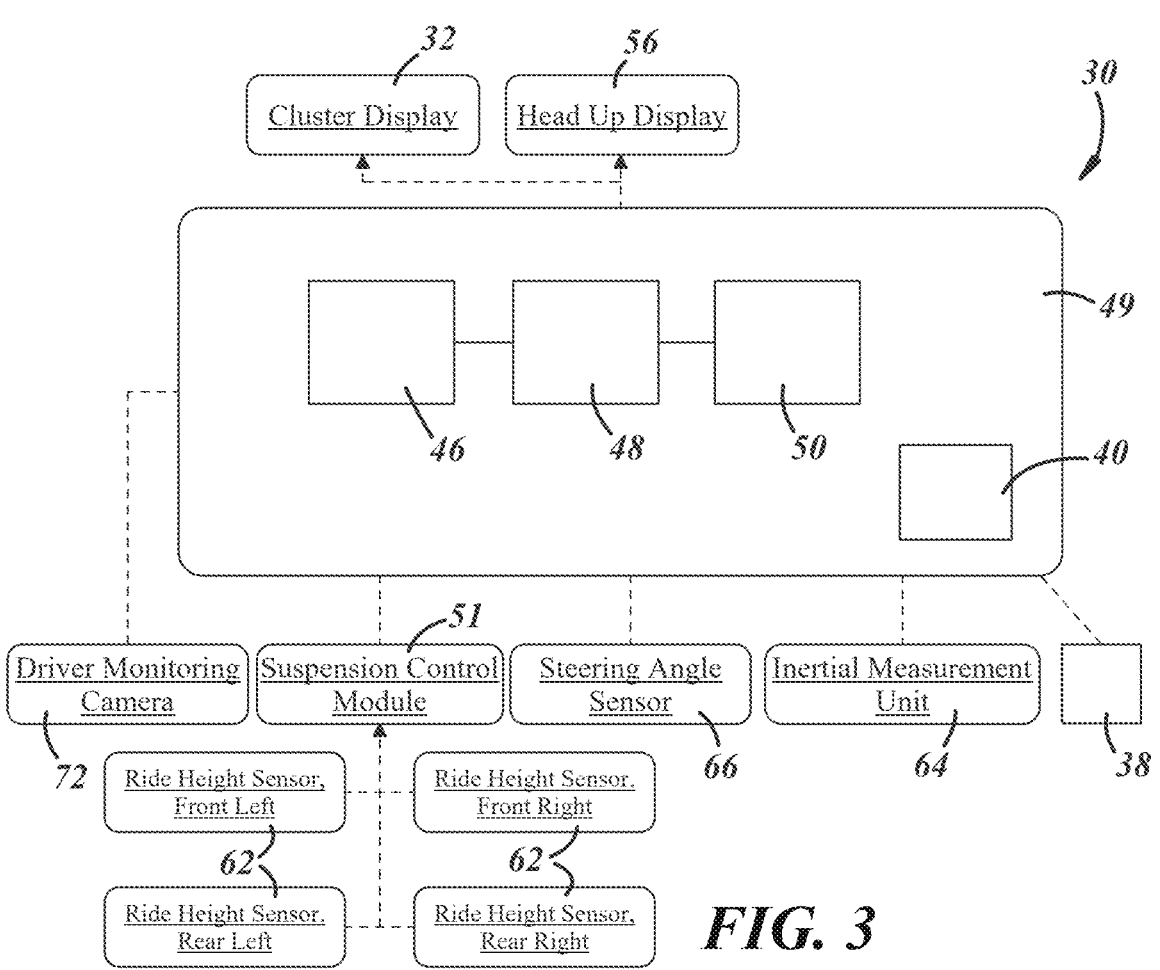
FIG. 3 is a diagrammatic view of the control system.

The display 32 may be carried by the vehicle body 12, such as within a passenger compartment 44 of the vehicle 10, and may be coupled to the cameras 28 to provide a view of the area to be traversed by the vehicle 10. The camera 28 and display 32 may be coupled to the control system 30 which may include, as shown in FIG. 3, a processor 46 and memory 48 that includes executable programs 50 or instructions. The display 32, processor 46 and memory 48 may be of suitable types and such components in vehicles are well-known and will not be further described herein.

To perform the functions and desired processing set forth herein, as well as the computations therefore, the control system 30 may include, but is not limited to, one or more controller(s), control unit(s), processor(s), computer(s), DSP(s), memory, storage, register(s), timing, interrupt(s) (generally referred to by reference numeral 46), communication interface(s), and input/output signal interfaces, and the like, as well as combinations comprising at least one of the foregoing. For example, the control system 30 may include input signal processing and filtering to enable accurate sampling and conversion or acquisitions of such signals from communications interfaces and sensors. As used herein the terms control system 30 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 30 may be distributed among different vehicle modules, such as an infotainment system control module 49, suspension control module 51, engine control module or unit, powertrain control module, transmission control module, and the like, if desired.

The term "memory" 48 or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory 48 can store an operating system and/or instructions/programs 50 executable by a processor or controller or the like to enable control or allocate resources of a computing device.

As shown in FIG. 2, the display 32 may be part of a vehicle Human-Machine Interface, such as an infotainment system and may be located on or near a vehicle dashboard/instrument panel 52. Such displays may be called "heads-down" displays because they require a driver to lower their viewing angle from looking outward through a windshield 54 downward and within the vehicle 10 to see the display. The display may also or instead be provided as a so-called heads-up display 56 (HUD) 56 that is provided (e.g. projected) on the windshield 54 of the vehicle 10.

With a heads-up display 56, the information displayed can be viewed by a driver along with the environment outside the vehicle 10 and in view through the windshield 54. In at least some implementations, the information on the heads-up display 56 may include one or more graphics 58 (FIGS. 4-6) that indicate the path 60 the vehicle tires 14 will take when passing over the terrain ahead. This may, for example, help a driver navigate obstacles or more uneven or difficult terrain such as may be encountered on a trail or other off-road driving.

To compute and display the tire paths or vehicle travel path 60, multiple sensors may provide information to the control system 30. In addition to the terrain sensors or sources 42 noted previously, the vehicle 10 may include a suspension sensor 62 that is carried by a suspension component 18, a wheel 14 or the vehicle body 12. A separate suspension sensor 62 may be provided for one and up to each wheel 14 of the vehicle 10, as shown in FIG. 2, and are coupled to and provide an input signal to the control system 30 that is indicative of the vertical position of the suspension component/wheels 14. The vehicle 10 may further include an accelerometer 64, such as an inertial measurement unit (IMU). The IMU 64 can detect movements relating to the attitude or inclination (e.g. pitch, yaw and roll) of the vehicle 10 along several axes, and may be used with or separately from the suspension sensor(s) 62 to determine information about the slope of the ground on which the vehicle 10 is situated. The suspension sensor(s) 62 and IMU 64 or other accelerometers may also be considered to be terrain sources 42.

As noted above, the system also includes a steering system including a steering wheel 26, and one or more steering sensors 66 that determine one or both of an intended steering angle for the vehicle 10, or an actual steering angle for the vehicle 10. The steering sensor(s) 66 may be coupled to any desired component of the steering system and also to the control system 30 to provide a steering angle input to the control system 30.

The control system 30 has inputs from both the terrain sensors/sources 42 and steering sensor(s) 66 which provide information regarding vehicle attitude/orientation and intended and/or actual steering angle. From that information, the control system 30 can determine the nature of the terrain/inclination the vehicle 10 is currently on, the nature of terrain/inclination ahead of the vehicle 10, and the intended path of travel for the vehicle 10. The control system 30 can then provide to the display to, based on these inputs, graphics depicting or representing the path 60 that one or more wheels 14 will take with continued travel. This may be shown on the display overlaid on an image provided by the camera 28. For example, when the vehicle 10 is traveling forward, the view captured by a forward-facing camera may be shown on the display 32, 56, and one or more of: a first graphic 68 (which may include one or more lines or polygons or other shapes) may be shown on the display that is indicative of the forward path of the front left wheel 14; and a second graphic 70 (which may include one or more lines or polygons or other shapes) may be shown on the display that is indicative of the forward path of the front right wheel 14. In at least some implementations, the first and second graphics 68, 70 may be elongated straight or curved lines or polygons laid out along the camera view, or in the case of a heads-up display 56, the graphics may be provided on the windshield 54 to match up with the terrain ahead of the vehicle 10.

Further, in the case of a heads-up display 56 (HUD), the control system 30 may also determine the viewing angle of a driver of the vehicle 10. The viewing angle of the driver may be determined from a driver sensor 72, such as a driver monitoring camera, that has a field of view that includes the drivers face. From analysis of the output of the driver sensor 72, the position of one or both of the driver's eyes (3D position, e.g. vertical, horizontal and distance from the windshield 54) can be determined and thus the angle at which the driver can view the HUD 56 can be determined. With the viewing angle and the terrain information, the path of travel 60 can be more accurately positioned relative to the actual environment ahead of the vehicle 10 so that the indicated travel path graphics 68, 70 can be overlayed in a realistic position on the windshield 54 as viewed by the driver and not floating too far above the path ahead, or located too low relative to the path. For example, if the vehicle 10 is inclined upwardly, with the front of the vehicle 10 aimed or oriented higher than the ground ahead of the vehicle 10 (e.g. the area ahead of the vehicle 10 that aligns with the travel path to be displayed), the travel path graphics may be displayed lower on the HUD to more closely align with the ground ahead, and vice versa.

Figure 4:
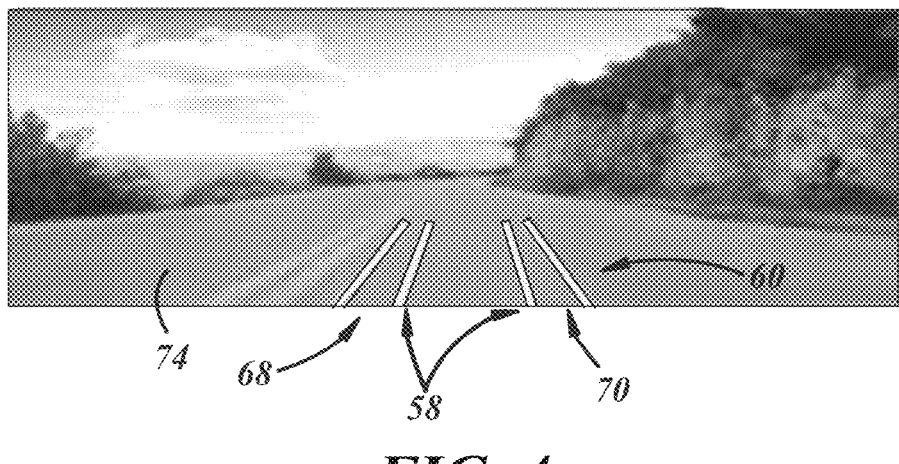
FIG. 4 is a view of a vehicle display showing a travel path with the vehicle on a level surface.
Figure 5:
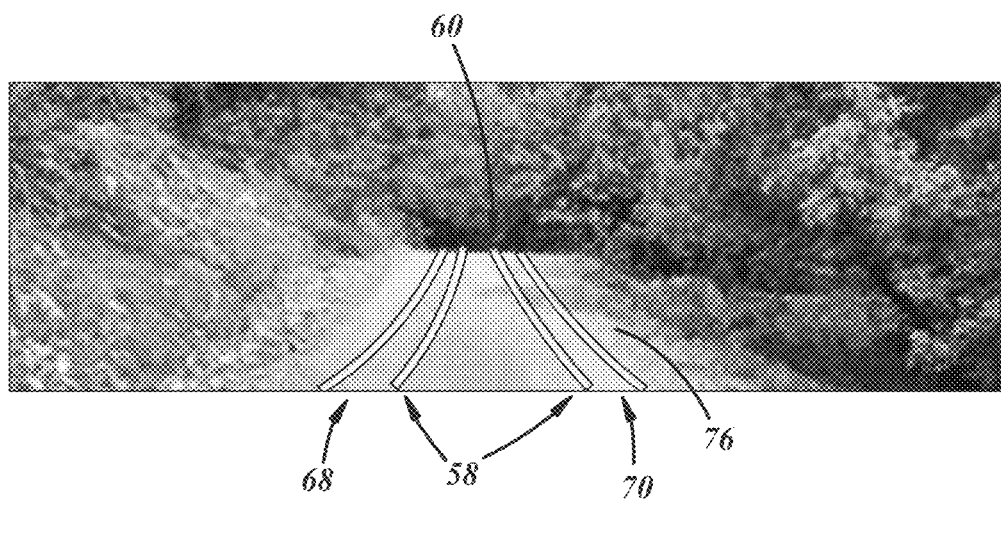
FIG. 5 is a view of the vehicle display showing a travel path with the vehicle on an uphill or inclined surface.
Figure 6:
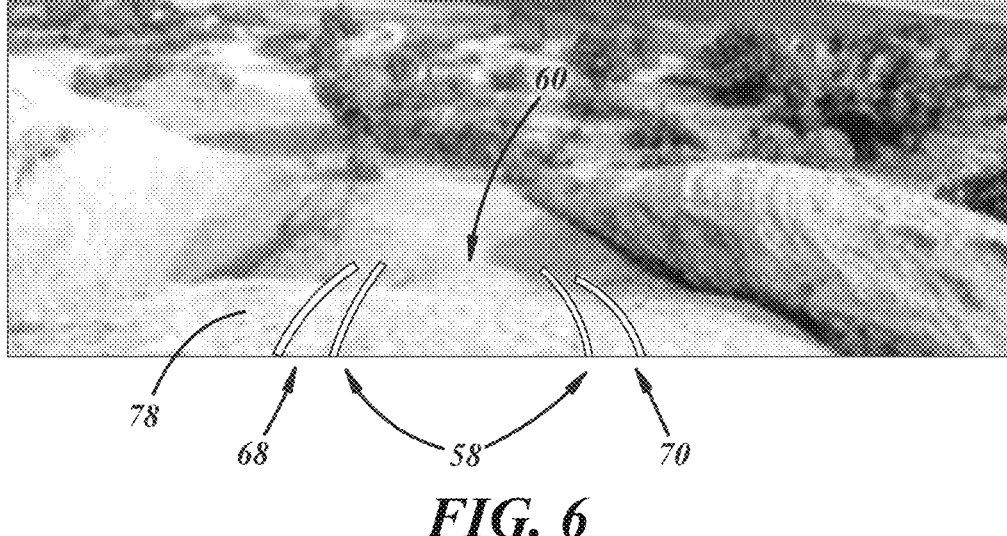
FIG. 6 is a view of the vehicle display showing a travel path with the vehicle on a downhill surface.

As shown in FIG. 4, with the vehicle 10 traveling on a flat or relatively flat road or path 74, the travel path graphics 68, 70 may be shown as straight lines that converge slightly toward the horizon. In this way, a distance between the graphics 68, 70 is greater nearer the vehicle 10 (shown lower on the HUD 56) than farther away from the vehicle 10 (shown higher on the HUD 56). When the vehicle 10 is traveling on or toward and uphill or inclined section of the road or path 76, as shown in FIG. 5, the travel path graphics 68, 70 may be provided in a manner that shows the driver the incline ahead. In this example, the travel path graphics 68,

70 are curved and have an increased angle of convergence nearer the vehicle 10 (shown lower on the HUD 56) than farther away from the vehicle 10 (shown higher on the HUD 56). When the vehicle 10 is traveling on or toward a downhill or declined section of the road or path 78 (i.e. a portion that slopes downwardly), as shown in FIG. 6, the travel path graphics 68, 70 may be provided in a manner that shows the driver the decline or downward slope ahead. In this example, the travel path graphics 68, 70 are curved and have a decreased angle of convergence nearer the vehicle 10 (shown lower on the HUD 56) than farther away from the vehicle 10 (shown higher on the HUD 56).

In at least some implementations, the travel path may be represented by a solid or filled-in polygon rather than spaced apart lines for each wheel. In at least some implementations, the transparency of the travel path graphics may be different for a downhill travel path than for an uphill travel path. For example, the uphill travel path may be darker or less transparent than the downhill travel path, or different colors may be used, or any combination of these including combinations with different curvature as noted above.

Figure 7:
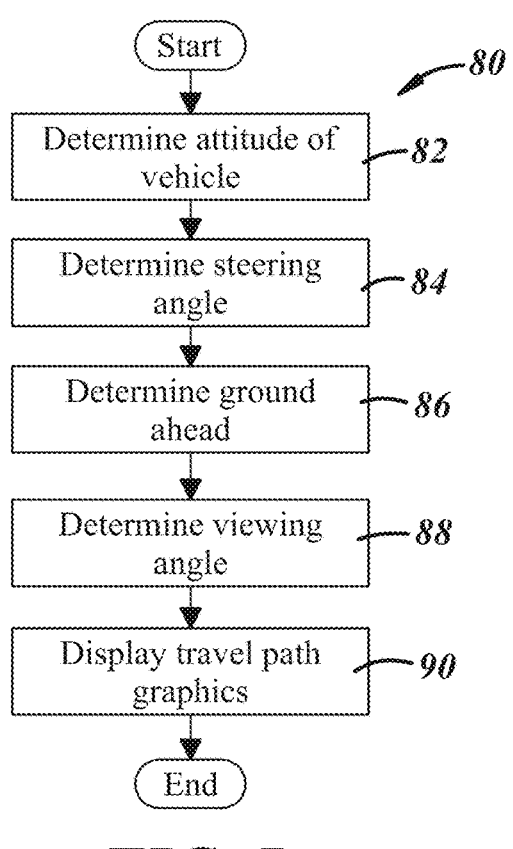
FIG. 7 is a flowchart of a method for projecting a path forward that matches the terrain ahead.

The control system 30 may utilize a method 80 to determine a travel path 60 to display, and where to display the travel or tire path 60 relative to a driver's viewing angle, such as the method set forth in FIG. 7. The method 80 starts at step 82 in which the attitude of the vehicle 10 is determined, which may be done with one or more of the suspension sensors 62 or accelerometers 64 like the IMU and/or a remote source 38. In step 84, the steering angle of the vehicle 10 is determined, by data from the steering sensor(s) 66, so that the travel path 60 can be calculated at least so far as the intended near future direction of the vehicle 10 is considered. In step 86, one or more characteristics of the inclination or orientation of the ground ahead may be determined. This may be done by one or more of the terrain sensors 42 and may be done to determine if the ground ahead of the vehicle 10 is inclined, declined or level. In step 88, the driver's viewing angle may be determined, such as by use of the data from the driver sensor 72 (e.g. camera).

Finally, in step 90, the travel path graphics 68, 70 are displayed on the HUD 56 and/or other displays 32 within the vehicle 10. As noted above, the travel path 60 in at least some implementations is determined and shown as a function of the direction of travel, the slope or pitch of the ground ahead (i.e. whether the road is level, inclined or declined), and the driver's viewing angle. In this way, a realistic and information travel path 60 can be shown to a driver, that better blends in with the actual path ahead of the vehicle 10 as viewed through the windshield 54 and through the portion of the windshield 54 including the HUD 56, or better comports with an image of the ground ahead that is provided by a camera and shown on a display 32.

What is claimed is:

1. A method for displaying travel path graphics in a vehicle, comprising:
   determining a slope of the ground ahead of a vehicle;
   determining a steering angle of the vehicle;
   determining a viewing angle of a driver of the vehicle; and
   providing a travel path graphic on a display of the vehicle,
      wherein the travel path graphic is provided as a function of the steering angle and the slope of the ground ahead of the vehicle, and wherein the display is a heads-up display provided on or near a vehicle windshield and wherein the position of the travel path graphic on the display is adjusted as a function of the viewing angle.

2. The method of claim 1 which also includes determining an attitude of the vehicle and wherein a position of the travel path graphic on the display is adjusted as a function of the attitude of the vehicle.

3. The method of claim 1 wherein the travel path graphic has a different shape if the ground ahead is determined to be inclined than if the ground ahead is determined to be level.

4. The method of claim 3 wherein the travel path graphic has a different shape if the ground ahead is determined to slope downwardly than if the ground ahead is determined to be either inclined or level.

5. The method of claim 3 wherein the travel path graphic includes lines that represent a determined path of two wheels of the vehicle.

6. The method of claim 5 wherein the lines converge at a constant angle if the ground ahead is determined to be level.

7. The method of claim 5 wherein the lines have an increased angle of convergence lower on the display than higher on the display if the ground ahead is determined to be inclined.

8. The method of claim 5 wherein the lines have a decreased angle of convergence lower on the display than higher on the display if the ground ahead is determined to slope downwardly.

9. A system used to display travel path graphics in a vehicle, comprising:
one or more vehicle sensors;
a control system in communication with the one or more vehicle sensors, and having a processor and memory with programming to:
determine a slope of the ground ahead of a vehicle;
determine a steering angle of the vehicle; and
provide a travel path graphic on a display of the vehicle, wherein the travel path graphic is provided as a function of the steering angle and the slope of the ground ahead of the vehicle, and wherein the travel path graphic has a different shape if the ground ahead is determined to be uphill, downhill or level, wherein the display is a heads-up display that is provided at least in part on a windshield of the vehicle, and wherein a driver sensor, and a location of the travel path graphic relative on the heads-up display is adjusted as a function of the viewing angle.

10. The system of claim 9 wherein the one or more vehicle sensors includes a steering angle sensor.

11. The system of claim 9 wherein the one or more vehicle sensors includes at least one terrain sensor.

12. The system of claim 11 wherein the at least one terrain sensor includes one or more of a camera, radar or lidar sensor.

13. The system of claim 11 wherein the at least one terrain sensor includes a remote source including altitude data for an area including the ground ahead.

14. The system of claim 9 wherein a location of the travel path graphic relative on the heads-up display is adjusted as a function of the vehicle attitude.

15. A method for displaying travel path graphics in a vehicle, comprising:
determining a slope of the ground ahead of a vehicle;
determining a steering angle of the vehicle; and
providing a travel path graphic on a display of the vehicle, wherein the travel path graphic is provided as a function of the steering angle and the slope of the ground ahead of the vehicle, and the travel path graphic has a different shape if the ground ahead is determined to be inclined than if the ground ahead is determined to be level, the travel path graphic includes lines that represent a determined path of two wheels of the vehicle, and wherein one or more of: a) the lines converge at a constant angle if the ground ahead is determined to be level; b) the lines have an increased angle of convergence lower on the display than higher on the display if the ground ahead is determined to be inclined; and c) the lines have a decreased angle of convergence lower on the display than higher on the display if the ground ahead is determined to slope downwardly.

* * * * *